Dec. 30, 1958          M. MAY          2,866,237
WEATHERSTRIP MOUNTING ASSEMBLY
Filed April 29, 1955
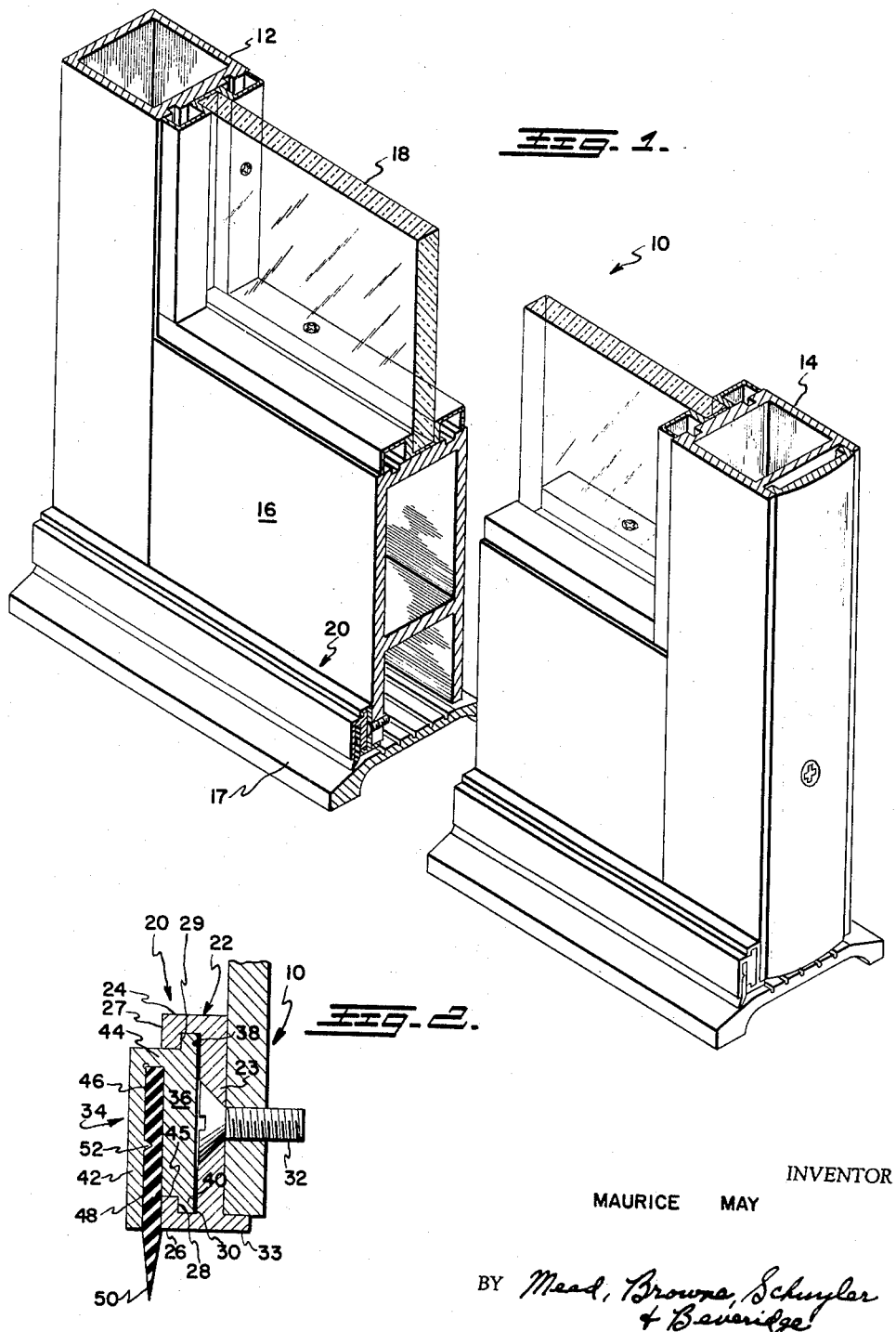
INVENTOR
MAURICE MAY United States Patent Office 2,866,237
Patented Dec. 30, 1958

2,866,237

WEATHERSTRIP MOUNTING ASSEMBLY

Maurice May, Atlanta, Ga., assignor to American Art Metals Company, Atlanta, Ga., a corporation of Delaware Application April 29, 1955, Serial No. 504,865

1 Claim. (Cl. 20—69)

This invention relates to weatherstrips and mounting arrangements thereof, and to an improved weatherstrip mounting assembly particularly suitable for use with threshold weather strips.

It is an object of this invention to provide a mounting assembly for weatherstrips which permits the weatherstrip to be securely positioned without the use of visible fastening means.

It is another object of this invention to provide a mounting assembly for weatherstrips, particularly threshold weatherstrips, which is neat and attractive in appearance and, at the same time, securely holds the weatherstrip in proper position with respect to the adjacent surface to be sealed, such as a threshold.

It is still a further object of this invention to provide a weatherstrip mounting assembly particularly suitable for mounting on doors to seal a threshold, in which the weatherstrip holding means may be easily removed when desired.

In achievement of these objectives, there is provided in accordance with an embodiment of this invention a mounting assembly for a threshold weatherstrip including a longitudinally extending channel-shaped support and guide member which is rigidly attached by suitable fastening means such as screws to the lower edge of the door. A longitudinally extending weatherstrip support member is adapted to be slidably received in the channel-shaped support member. The channel-shaped member and the slidably received weatherstrip support member are provided with cooperating tongue and groove elements to permit the interlocked slidable engagement of these members. The weatherstrip support member includes an inner and an outer leg portion joined at their upper edges. The inner leg portion slidably engages the support and guide member attached to the door and the outer leg portion is laterally spaced from the inner portion to define a longitudinally extending slot or recess which is open at its lower edge to receive the weatherstrip. The weatherstrip, which is made of plastic or other flexible material, is secured between the two laterally spaced leg portions of the weatherstrip support member and projects transversely beyond the longitudinal edges of the support and guide member and of the weatherstrip support member into sealing engagement with the threshold.

Further objects and advantages of the invention will become apparent from the following description taken in connection with the accompanying drawing in which:

Fig. 1 is a perspective view of the lower end of a metal door equipped with the weatherstrip mounting assembly of the invention; and Fig. 2 is an enlarged detail view in vertical section of the weatherstrip mounting assembly.

Referring now to the drawing, there is shown a fragment of a door generally indicated at 10 and including a pair of oppositely disposed door stiles 12 and 14 connected at their lower ends by a transversely extending bottom rail member 16. A panel member 18, preferably made of glass or other transparent material, extends between the oppositely disposed door stiles 12 and 14 and is supported upon the upper edge of rail member 16. The door is disposed above a threshold 17 which is of conventional construction. Threshold 17 is sealed by the weatherstrip included in the weatherstrip mounting assembly to be described. The door in the illustrated embodiment is made of metal, such as aluminum. However, the weatherstrip mounting assembly to be described may be attached to a wood door, if desired.

The weatherstrip mounting assembly of the invention is generally indicated at 20 and is connected to the lower edge of the door. Mounting assembly 20 extends across the entire width of the door from the left-hand edge of door stile 12 with respect to the view shown in Fig. 1 to the right-hand edge of door stile 14. The mounting assembly includes a channel-shaped support and guide member generally indicated at 22, preferably formed of a metal such as aluminum. Support member 22 includes a vertical web portion 23 and laterally extending upper and lower flange portions 24 and 26. Flange portions 24 and 26 are respectively provided with inwardly turned edges or flange portions 27 and 28 which define grooves 29 and 30 between the inner edges of the respective flange portions 27 and 28 and the adjacent surface of vertical web 23. The lower flange 26 includes a laterally projecting portion 33 which lies beneath and in abutting relation to the underneath edge surface of door 10. Channel-shaped support member 22 is rigidly attached to the lower edge of door 10 by suitable fastening means such as flat-headed screws 32 which are received in countersunk openings in the vertical web portion 23.

An elongated weatherstrip support member generally indicated at 34 and preferably formed of a metal such as aluminum is adapted to be slidably received in interlocked engagement with support member 22. Weatherstrip support member 34 is of generally U shape in cross section and includes an inner leg portion 36 having oppositely disposed longitudinally extending tongue portions 38 and 40 which are received in interlocked engagement by the grooves 29 and 30 of support member 22. Weatherstrip support member 34 also includes an outer leg portion 42 which is laterally spaced from inner leg 36 but is joined thereto at its upper end by a bridging portion 44. Bridging portion 44 is spaced by a slight clearance distance below the underneath edge of downwardly extending flange 27. The lower edge 45 of inner leg portion 36 is adapted to slide along the upper edge of vertically extending flange 28 of support 22. Inner and outer leg portions 36 and 42 of the weatherstrip support member extend longitudinally in planes parallel to but spaced from each other. The spacing between the facing inner surfaces of portions 36 and 42 define a vertically extending groove 46.

A longitudinally extending weatherstrip 48, made of plastic or other suitable flexible weatherstrip material, is positioned in groove 46 between leg portions 36 and 42, weatherstrip member 48 extending for the entire height of groove 46 and projecting vertically and transversely downwardly beyond the lower edges of channel-shaped support 22 and of weatherstrip support member 34 where it terminates in a tapered edge 50 which engages threshold 17.

The channel-shaped member 22 and the weatherstrip support member 34 may both be formed of suitable metal extrusions of aluminum or other suitable metals. In order to aid in securing weatherstrip member 48 securely within the groove 46, one or both of the inner surfaces of leg portions 36 or 42 may be formed with pointed projections such as the projections 52 shown on the inner surface of portion 42. The weatherstrip support member 34, as originally formed by extrusion or by other manufacturing process, is provided with sufficient spacing between the facing surfaces of leg portions 36 and 42 to permit the weatherstrip member 48 to be inserted without difficulty. Pressure is then applied to cause leg portion 42 to move toward leg portion 36 to suitably hold the weatherstrip securely in position.

In assembling the weatherstrip mounting assembly on the door, channeled support and guide member 22 is first suitably attached to the lower edge of the door by countersunk fastening means 32 and weatherstrip support member 34 is then slid lengthwise into member 22. After support member 34 has been suitably positioned in support member 22, the ends of support 22 may be tapped to prevent weatherstrip support member 34 from sliding out.

It can be seen from the foregoing that there is provided in accordance with this invention a weatherstrip mounting assembly which is easily attached to the edge of a door or the like and which is particularly suitable for mounting a threshold weatherstrip. The mounting assembly is neat and attractive in appearance and permits the fastening means which secures the assembly to the door to be concealed from view.

While there has been shown and described a particular embodiment of the invention, it will be obvious to those skilled in the art that various changes and modifications may be made therein without departing from the invention and, therefore, it is aimed to cover all such changes and modifications as fall within the true spirit and scope of the invention.

What I claim as my invention is:

A weatherstrip assembly for attachment to a door adjacent an edge thereof, comprising a retaining element fixedly attachable to the door and having longitudinal parallel flanges spaced apart to define a channel opening away from the door, a weatherstrip holder slidably carried by said retaining element and of generally U-shape having spaced legs and a joining web, one of said legs being shorter than the other and having one surface flush with the exterior of said retaining element, the shorter leg being disposed within said channel and the remainder of said holder being disposed exteriorly of said channel, a weatherstrip interposed between and secured by said legs and lying wholly outside said channel, with the longitudinal edge thereof projecting beyond said holder to engage a threshold, the weatherstrip being confined by the longer leg of said holder against the exterior surface of said retaining element immediately adjacent the weatherstrip longitudinal edge.

References Cited in the file of this patent

UNITED STATES PATENTS

| | | |
|---|---|---|
| 1,192,361 | Wistrom | July 25, 1916 |
| 1,912,255 | Clark | May 30, 1933 |
| 2,344,278 | Balousek | Mar. 14, 1944 |
| 2,445,315 | Curley | July 20, 1948 |
| 2,612,664 | Sidden | Oct. 7, 1952 |
| 2,694,239 | Brunker | Nov. 16, 1954 |